Patented June 27, 1933

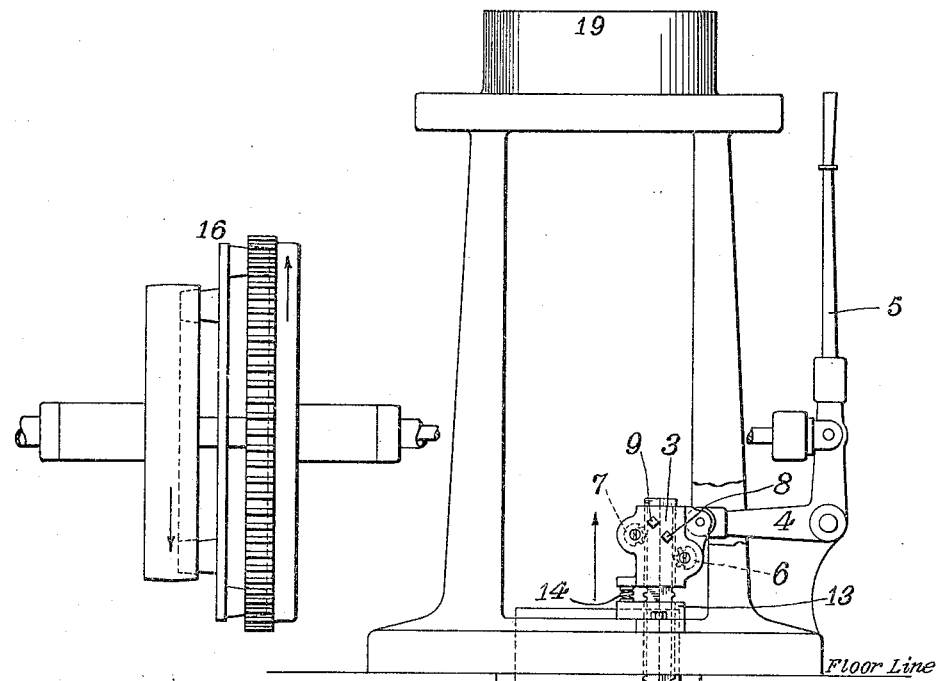
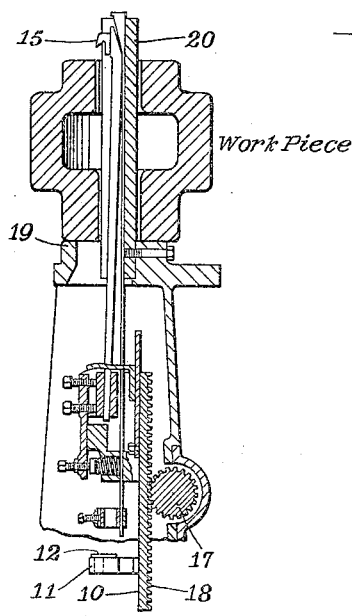
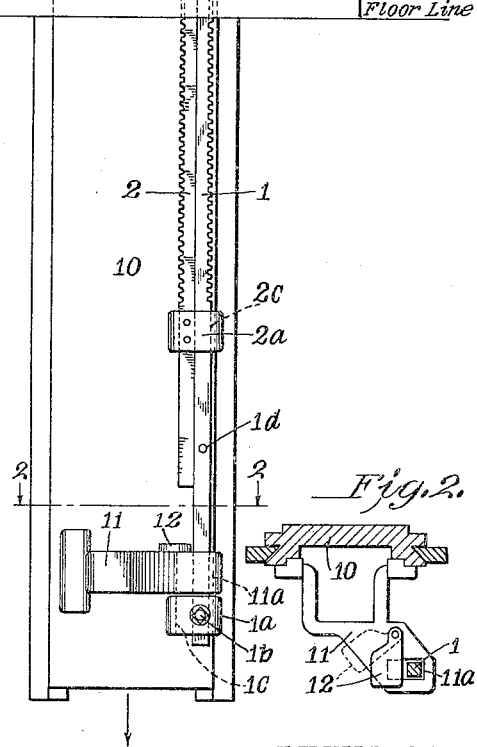

1,915,506

UNITED STATES PATENT OFFICE

WILLIAM J. WINSTON, OF SAGINAW, MICHIGAN, ASSIGNOR TO MITTS & MERRILL, OF SAGINAW, MICHIGAN, A CORPORATION OF MICHIGAN

KEYSEATING MACHINE

Application filed October 16, 1931. Serial No. 569,173.

This invention relates to machines for cutting keyways and oil grooves in the hubs of pulleys, for cutting long scores or recesses, for making straight or tapered keyways and doing other work of similar character. A keyseater of known design to which my invention is applicable was shown and described in Patent No. 1,052,152 issued May 7, 1912, wherein the cutting tool was fixed to a cross-head that was slidable up and down in ways formed in an upright post on the table of the machine frame, the work piece being fixed to the table with its hub encircling the post. The tool traveled vertically, cutting on the down stroke.

The tool was actuated by a toothed rack fixed to the slidable cross-head. A power driven pinion mounted in a fixed bearing on the frame meshed with the rack and its direction of rotation was reversed by means of a reversing clutch shifted by a lever that tripped automatically each time the cross-head came to an end of its stroke.

A trip rod with two collars adjustable toward and from each other and having means for clamping them to the rod in any desired spaced relation was suspended from the end of the clutch-shifting lever. The trip rod was actuated by a lug on the reciprocatory cross-head that encountered first one collar and then the other and so moved the rod endwise, thereby operating the trip lever which shifted the clutch and reversed the direction of travel of the cross-head.

To adapt the machine to different kinds of work such as, for example, pulley hubs of various lengths, stands and brackets of various heights requiring keyways to be made in them at different distances from their bases, and to change the length of keyway, the length of travel of the cutting tool had to be changed, and to change the location of the keyway in the work piece the whole cutting zone of the tool had to be shifted according to the desired new height of the keyway with respect to the work table. To make those changes, the trip collars of the earlier machine could be adjusted manually but they were so located that the attendant was compelled to go to a room beneath the machine floor in order to make the adjustment.

An object of my present invention is to provide a novel means whereby appropriate adjustments of the tool travel are made with greater ease, speed and accuracy than formerly and whereby a greater working range is imparted to the tool to suit work pieces of different sizes and shapes.

My claimed improvement is in the trip rod structure, including the means by which it is suspended from the lever, in an improved mechanism for increasing and decreasing the effective length of the trip rod, and in a novel arrangement for shifting the relatively spaced positions of the trip collars without requiring the operator to go to the room below the machine in order to adjust the collars. Another claimed feature of my improvement is a novel removable stop or tappet member on the cross-head bracket whereby the tool can be made to cut very short keyways in that part of the work piece close to the work table.

A structure embodying the invention in its preferred form will now be described.

Since the invention is adapted to be applied to known machines of the kind referred to, I have illustrated only so much of the prior structure as deemed necessary for completely understanding the construction and mode of operation of the improvement, omitting the details of the cross-head reversing clutch and the operative connections between the clutch and the pinion that actuates the cross-head.

In Fig. 1 is shown a tripping and adjusting device embodying my invention in its preferred form, the frame and cross-head of the machine being shown diagrammatically.

Fig. 2 is a transverse section on line 2—2 of Fig. 1.

Fig. 3 is a vertical section of the machine, partly broken away, showing the relationship of the cross-head to the cutting tool and to the work piece on the table top.

The trip rod proper is made in two parts and consists of two long toothed racks 1, 2, slidable lengthwise one on the other. The upper ends of both racks pass through an apertured housing 3 that is pivotally mounted on the end of a horizontal arm 4 of clutch shifting lever 5. Two pinions 6, 7, mounted in the housing 3 mesh with the racks 1, 2. Each pinion can be rotated by a removable hand crank, not shown, to raise and lower the racks independently. Set screws 8, 9, in the housing are used to clamp the racks 1, 2, while the machine is in operation.

Near the lower end of rack 1 is an adjustable collar 1a with a set screw 1b to clamp it in any position to which it may be adjusted. A like collar 2a is riveted to rack 2. Through the collars are apertures 1c and 2c, each large enough to accommodate both racks. Normally the two racks hang freely from the set screws while cross-head 10 and a projecting bracket 11 carried by it are traveling up and down. Bracket 11, like the collars 1a, 2a, has an aperture 11a through which the racks hang without interfering with the up and down movement.

A plate 12, pivoted to the bracket 11, is used when desired to cover part of the aperture 11a in the bracket and thus act as a tappet for the bottom end of toothed rack 2. A spring 14 is placed between housing 3 and a slotted member 13 on the base of the machine to floatingly sustain the weight of the housing 3 and of the racks 1, 2, and thereby reduce jarring and ease the movement of the racks when bracket 11 strikes against the collars 1a, 2a.

To start the machine, clutch shifting lever 5 is moved by hand so as to cause clutch 16 to actuate, by known means, the main pinion 17, Fig. 3, and rack 18 on the back face of cross-head 10. The cross-head and the tool 15 then make their down stroke. When bracket 11 reaches the lower collar 1a, Fig. 1, it pulls the racks 1, 2, downward, actuating shift lever 5 which disengages the clutch 16 and reverses it, causing cross-head 10 to reverse and move up. Reaching the top of its stroke the cross-head bracket 11 contacts with the upper collar 2a and reverses the clutch 16, causing the tool to repeat its downward stroke.

All adjustments for length of stroke, from the shortest cutting movement of the tool to the longest, are made by means of the racks 1, 2, and the tappet collars 1a, 2a. When extremely short keyseats are to be cut in a zone close to the table 19, that is to say, with the cross-head 10 working in a zone that is located near the bottom of its stroke the tappet plate 12 is moved from the dotted line position in Fig. 2 to the position shown in full lines so as to close about half of the opening 11a in the bracket 11. The plate 12 then becomes an abutment that strikes the bottom end of the rack 2, on the up stroke of the cross-head and causes earlier reversal and shorter stroke of the cutting tool.

When a short tool post 20 shown in Fig. 3 is used, and the cross-head 10 is required to work near the top of the post for cutting a short keyway, the bottom tappet collar 1a is moved up along the rack 1 and its set screw 1b is inserted in a recess 1d. This is the only adjustment that requires the attendant to go to the room below the machine.

All ordinary adjustments for varying the length of tool stroke can be made by the operator, by means of the toothed pinions 6, 7, and set screws 8, 9, in the housing 3 without making any adjustments below the floor line, whereas in the former machine each adjustment of the collars necessitated the operator going beneath the machine. After a tentative adjustment of collars 1a, 2a, has been effected the cross-head 10 is put into trial action and then the operator can easily and quickly make any necessary minor changes to perfect the accuracy of the adjustment, doing this without leaving his usual station at the machine.

Having thus described my invention, what I claim and desire to secure by Letters Patent is:

1. In a keyseating machine having a power actuated reciprocatory tool-carrying cross-head, adjustable means associated with said cross-head for effecting reversal of movement thereof comprising a housing pivotally connected to the actuating means of said cross-head, a spring seat for said housing, two toothed racks carried by said housing and longitudinally adjustable therein, an abutment member on each rack, a bracket fixed to the cross-head and apertured to receive said racks and to slide lengthwise of the same between said abutment members, a member on said bracket movably adapted to cover part of the aperture therein, pinions in said housing meshing with said racks for moving either rack lengthwise independently of the other, and clamping means for securing said racks to the housing in variously adjusted positions.

2. In a keyseating machine having a power actuated reciprocatory tool-carrying cross-head, adjustable means associated with said cross-head for effecting reversal of movement thereof comprising a housing pivotally connected to the actuating means of said cross-head, a spring seat for said housing, two toothed racks carried by said housing, and longitudinally adjustable therein, an abutment member on each rack, a bracket fixed to the cross-head positioned to slide lengthwise of said racks between said abutment members, pinions in said housing operatively engaging said racks for raising and lowering either rack independently of the other, and clamping means securing said racks to the housing in variously adjusted positions.

3. In a keyseating machine having a power actuated reciprocatory tool-carrying cross-head, adjustable means associated with said cross-head for effecting reversal of movement thereof comprising a housing pivotally connected to the actuating means of said crosshead, a spring seat for said housing, two toothed racks carried by said housing and longitudinally adjustable therein, an abutment member on each rack, a bracket fixed to the cross-head and positioned to slide lengthwise of said racks between said abutment members, pinions in said housing meshing with said racks for moving either rack lengthwise independently of the other, and clamping means for securing said racks to the housing in variously adjusted positions.

4. In a keyseating machine having a power actuated and reciprocatory tool-carrying cross-head, the herein described adjustable means associated with said cross-head for effecting reversal of movement thereof, said means comprising the combination of a housing pivotally connected to the actuating means of said cross-head, a spring supporting said housing, two toothed racks longitudinally adjustable relatively to said housing, a collar on each rack, a bracket mounted on the cross-head and movable lengthwise of said racks between said collars, and pinions rotatable in said housing and meshing with said racks and adapted to raise and lower either rack independently of the other.

5. In a keyseating machine having a power actuated and reciprocatory tool-carrying cross-head, the combination of a housing operatively connected to the actuating means of said cross-head, two rods carried by said housing and longitudinally adjustable therein, an abutment member on each rod, an apertured bracket fixed to the cross-head and slidable lengthwise of said rods between said abutment members, and means associated with said housing operatively engaging said rods and adapted to raise and lower either rod independently of the other.

In testimony whereof, I affix my signature.

WILLIAM J. WINSTON.